(12) United States Patent
Gupta et al.

(10) Patent No.: US 11,689,363 B2
(45) Date of Patent: Jun. 27, 2023

(54) METHOD FOR SETTING PERMISSIONS FOR CRYPTOGRAPHIC KEYS, COMPUTER PROGRAM AND CRYPTOGRAPHIC PROCESSING SYSTEM

(71) Applicant: NXP B.V., Eindhoven (NL)

(72) Inventors: Sujash Sen Gupta, Bangalore (IN); Venkatesh H Nayak G, Bangalore (IN); Hugues Jean Marie de Perthuis, Garcelles (FR)

(73) Assignee: NXP B.V., Eindhoven (NL)

( * ) Notice: Subject to any disclaimer, the term of this patent is extended or adjusted under 35 U.S.C. 154(b) by 33 days.

(21) Appl. No.: 17/304,020

(22) Filed: Jun. 14, 2021

(65) Prior Publication Data
US 2021/0399880 A1    Dec. 23, 2021

(30) Foreign Application Priority Data

Jun. 23, 2020 (EP) .................................. 20305686

(51) Int. Cl.
*H04L 9/08* (2006.01)

(52) U.S. Cl.
CPC ............ *H04L 9/088* (2013.01); *H04L 9/0861* (2013.01)

(58) Field of Classification Search
CPC ....... H04L 9/088; H04L 9/0861; G06F 21/46; G06F 21/602; G06F 21/604
See application file for complete search history.

(56) References Cited

U.S. PATENT DOCUMENTS

| 7,681,046 B1 | 3/2010 | Morgan et al. |
| 9,058,297 B2 * | 6/2015 | Ducharme .......... G06F 12/1408 |
| 9,647,993 B2 * | 5/2017 | Gaspar Cuevas ....... H04L 9/083 |
| 11,424,919 B2 * | 8/2022 | Kärkkäinen .......... H04W 12/04 |
| 2010/0098255 A1 * | 4/2010 | Ciet ..................... H04L 9/0838 380/28 |

(Continued)

FOREIGN PATENT DOCUMENTS

| EP | 2161671 A2 | 3/2010 |
| EP | 3210333 A1 | 8/2017 |

(Continued)

OTHER PUBLICATIONS

NIST Special Publication 800-38B; Dworkin, Morris J.; "Recommendation for Block Cipher Modes of Operation: The CMAC Mode for Authentication"; May 2005; Published Oct. 6, 2016; DOI: https://doi.org/10.6028/NIST.SP.800-38B.

*Primary Examiner* — Han Yang (57) ABSTRACT

In accordance with a first aspect of the present disclosure, a method is conceived for setting permissions for cryptographic keys in a cryptographic processing system, comprising: generating at least one cryptographic key to be protected; assigning one or more configurable properties to said cryptographic key; wherein the configurable properties define at least one of a permission of performing a first set of predefined operations on the cryptographic key and a permission of using the cryptographic key for performing a second set of predefined operations. In accordance with a second aspect of the present disclosure, a corresponding computer program is provided. In accordance with a third aspect of the present disclosure, a corresponding cryptographic processing system is provided.

18 Claims, 7 Drawing Sheets

(56) References Cited

U.S. PATENT DOCUMENTS

2014/0211942 A1* 7/2014 Coric .................... H04L 9/0877
380/277
2017/0118018 A1* 4/2017 Dekker ................. G06F 21/602
2018/0287789 A1* 10/2018 Sridharan ........... H04L 63/0428

FOREIGN PATENT DOCUMENTS

| WO | 2013/053393 A1 | 4/2013 |
| WO | 2015/149836 A1 | 10/2015 |

* cited by examiner

METHOD FOR SETTING PERMISSIONS FOR CRYPTOGRAPHIC KEYS, COMPUTER PROGRAM AND CRYPTOGRAPHIC PROCESSING SYSTEM

CROSS-REFERENCE TO RELATED APPLICATIONS

This application claims priority under 35 U.S.C. § 119 to European Patent Application No. 20305686.6, filed on Jun. 23, 2020, the contents of which are incorporated by reference herein.

TECHNICAL FIELD

The present disclosure relates to a method for setting permissions for cryptographic keys in a cryptographic processing system. Furthermore, the present disclosure relates to a corresponding computer program and a corresponding cryptographic processing system.

BACKGROUND

Secure processing of data is important in many applications. In tamper-resistant integrated circuits, such as secure elements, the level of security is relatively high. It is noted that a secure element (SE) may be a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions.

SUMMARY

In accordance with a first aspect of the present disclosure, a method is conceived for setting permissions for cryptographic keys in a cryptographic processing system, comprising: generating at least one cryptographic key to be protected; assigning one or more configurable properties to said cryptographic key; wherein the configurable properties define at least one of a permission of performing a first set of predefined operations on the cryptographic key and a permission of using the cryptographic key for performing a second set of predefined operations.

In one or more embodiments, the first set of predefined operations includes at least one the following operations: reading the cryptographic key by a processing unit; exporting the cryptographic key to an external device; wrapping the cryptographic key; unwrapping the cryptographic key.

In one or more embodiments, the second set of predefined operations includes at least one of the following operations: using the cryptographic key to generate another cryptographic key; using the cryptographic key to wrap another cryptographic key; using the cryptographic key to perform a predefined cryptographic function, wherein the cryptographic function includes encrypting and/or decrypting data with said cryptographic key.

In one or more embodiments, the configurable properties are assigned to the cryptographic key when said cryptographic key is derived from a root key, and wherein said configurable properties are used to adjust derivation data used for deriving the cryptographic key from the root key.

In one or more embodiments, the cryptographic key is associated with at least one predefined state of the cryptographic processing system when said cryptographic key is derived from the root key.

In one or more embodiments, one or more operations performed using said cryptographic key fail if a current state of the cryptographic processing system does not correspond to said predefined state.

In one or more embodiments, the configurable properties are accessible to a secure processing unit of the cryptographic system.

In one or more embodiments, the configurable properties are only readable by said secure processing unit.

In one or more embodiments, at least some of the configurable properties are mutually exclusive.

In one or more embodiments, one or more operations performed on the cryptographic key or one or more operations performed using said cryptographic key are suspended or aborted if said operations are not permitted according to the configurable properties assigned to the cryptographic key.

In one or more embodiments, the cryptographic key is flushed if one or more operations are performed on the cryptographic key or one or more operations are performed using the cryptographic key which are not permitted according to the configurable properties assigned to the cryptographic key.

In one or more embodiments, the cryptographic key is wrapped before said cryptographic key is transmitted to a non-secure component, in particular to a non-volatile memory, of the cryptographic processing system.

In one or more embodiments, the cryptographic key is unwrapped when said cryptographic key is retrieved from the non-secure component of the cryptographic processing system.

In accordance with a second aspect of the present disclosure, a computer program is provided, comprising executable instructions, which, when executed by a cryptographic processing system, carry out a method of the kind set forth.

In accordance with a third aspect of the present disclosure, a cryptographic processing system is provided, comprising: a key generation unit configured to generate at least one cryptographic key; the key generation unit further being configured to assign one or more configurable properties to said cryptographic key; wherein the configurable properties define at least one of a permission of performing a first set of predefined operations on the cryptographic key and a permission of using the cryptographic key for performing a second set of predefined operations.

DESCRIPTION OF DRAWINGS

Embodiments will be described in more detail with reference to the appended drawings, in which.

DESCRIPTION OF EMBODIMENTS

Secure processing of data is important in many applications. In tamper-resistant integrated circuits, such as secure elements, the level of security is relatively high. It is noted that a secure element (SE) may be a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions.

The components of a secure element can typically be trusted. Therefore, cryptographic keys can for example be handled a central processing unit (CPU) of the secure element. However, for systems in which the CPU and other system components cannot be sufficiently trusted, it may be necessary to protect cryptographic keys. In other words, in such systems it should be prevented that cryptographic keys are accessed directly by the CPU or another component and that the CPU or other component is allowed to perform cryptographic operations using these keys. If such a protection can be realized, only a limited set of components may have to be designed with a high level of security, while other components may be non-secure. This, in turn, may reduce the cost and complexity of cryptographic processing systems of the kind set forth.

Now discussed are a method for setting permissions for cryptographic keys in a cryptographic processing system, as well as a computer program for carrying out said method and a corresponding cryptographic processing system, which facilitate achieving a high level of security while reducing the cost and complexity of the cryptographic processing system.

Figure 1:
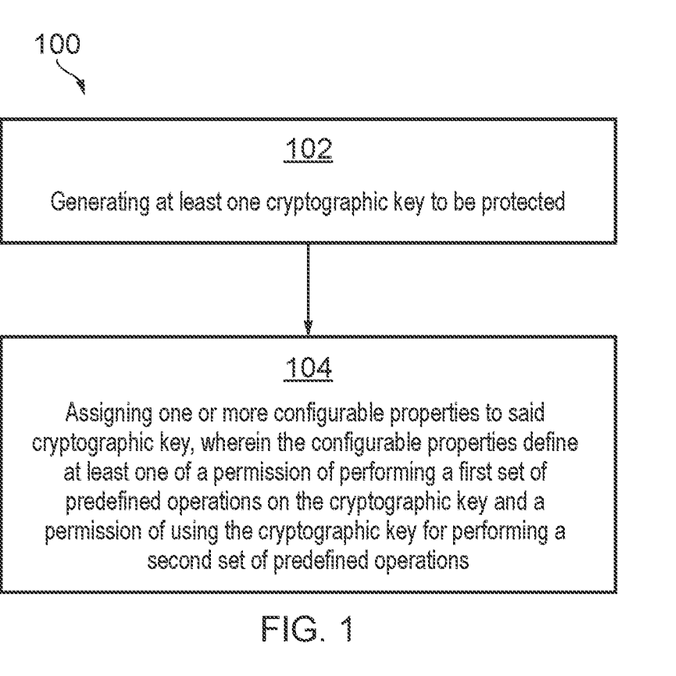
FIG. 1 shows an illustrative embodiment of a method for protecting cryptographic keys.

FIG. 1 shows an illustrative embodiment of a method 100 for setting permissions for cryptographic keys. The method 100 comprises the following steps. In step 102, at least one cryptographic key is generated which should be protected. Furthermore, in step 104, one or more configurable properties are assigned to said cryptographic key, wherein the configurable properties define at least one of a permission of performing a first set of predefined operations on the cryptographic key and a permission of using the cryptographic key for performing a second set of predefined operations. This facilitates increasing the level of security, because when operations are performed on the cryptographic key and/or when the cryptographic key is used for performing operations it may be verified whether this is permitted according to the configurable properties assigned to the cryptographic key. In other words, the configurable properties may ensure that a cryptographic key created for a specific purpose cannot be recreated for another purpose. Furthermore, since the properties are configurable, the permissions may be defined in a flexible manner. The method 100 may at least partially be implemented as a computer program.

Figure 2:
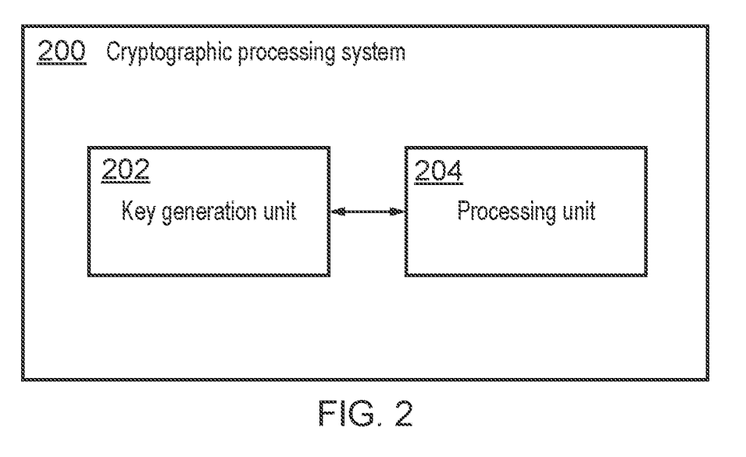
FIG. 2 shows an illustrative embodiment of a cryptographic processing system.

FIG. 2 shows an illustrative embodiment of a cryptographic processing system 200 in which a method of the kind set forth may be applied. The system 200 comprises a key generation unit 202 and a processing unit 204. The key generation unit 202 is configured to generate at least one cryptographic key. Furthermore, the key generation unit 202 is configured to assign one or more configurable properties to the cryptographic key, wherein the configurable properties define at least one of a permission of performing a first set of predefined operations on the cryptographic key and a permission of using the cryptographic key for performing a second set of predefined operations. The processing unit 204 may then perform operations on the cryptographic key and/or perform operations using the cryptographic key in accordance with the permissions defined by the configurable properties. As mentioned above, this facilitates increasing the level of security. Furthermore, the permissions may be defined in a flexible manner.

In one or more embodiments, the first set of predefined operations includes at least one the following operations: reading the cryptographic key by a processing unit, exporting the cryptographic key to an external device, wrapping the cryptographic key, and unwrapping the cryptographic key. It is noted that wrapping the cryptographic key refers to the process of encrypting the cryptographic key and its properties and adding an authentication code (i.e., an authenticity tag) to the result of the encryption. Similarly, unwrapping the cryptographic key refers to the process of verifying the authentication code and decrypting, upon or after a positive verification result, the encrypted cryptographic key and its properties. Since these operations may be performed frequently on cryptographic keys, setting appropriate permissions for these operations may significantly increase the level of security of the cryptographic processing system. Furthermore, in one or more embodiments, the second set of predefined operations includes at least one of the following operations: using the cryptographic key to generate another cryptographic key, using the cryptographic key to wrap another cryptographic key, and using the cryptographic key to perform a predefined cryptographic function, wherein the cryptographic function includes encrypting and/or decrypting data with said cryptographic key. Again, since these operations may be performed frequently, setting appropriate permissions for them may significantly increase the level of security of the cryptographic processing system.

In one or more embodiments, the configurable properties are assigned to the cryptographic key when said cryptographic key is derived from a root key, and said configurable properties are used to adjust derivation data used for deriving the cryptographic key from the root key. This results in a practical implementation, which ensures that the derived cryptographic key is tied to its properties. That is to say, some bits of the derivation data may be replaced by a value that represents the configurable properties. For example, in case there are 8 bits of properties, then bits 7:0 of the derivation data may be replaced by the value of these 8 bits. Said adjustment of the derivation data may be referred to as tweaking.

In one or more embodiments, the cryptographic key is associated with at least one predefined state of the cryptographic processing system when said cryptographic key is derived from the root key. Thereby, increasing the level of security is further facilitated. In particular, when derivation is performed, by setting an enable bit, the derivation data may be tweaked with a state of the system. Accordingly, the derived cryptographic key may optionally also be tied to said state of the system. The derived key may then be obtained by applying a key derivation function that takes the root key and the tweaked derivation data as an input. In order to tweak the derivation data, preselected bits of the derivation data may be replaced with a value indicative of the state of the device and the enable bit. For example, if the state of the system is represented by a value comprising 8×8 bits, 64+8 bits of the derivation data may be replaced. In particular, for each byte an enable bit may be used. If an enable bit is set to 1, then the corresponding byte is set to a value of a system setting, and if the enable bit is set to 0, then the corresponding byte is replaced by 0. For instance, if the state of the system is 01234567 . . . F and the enabled bits are 0, 1, 0, 1, then the tweak value will be 0023006700AB00EF55. Furthermore, in one or more embodiments, one or more operations performed using said cryptographic key fail if a current state of the cryptographic processing system does not correspond to said predefined state. This may limit the use of the cryptographic key to a specific context. For instance, if data is encrypted with a key generated with a state=0×ABCD, then if one tries to derive the encryption key when the state is BCDE, then the derived key will be completely different and a decryption operation using the derived key will not correctly decrypt the data.

Furthermore, in one or more embodiments, the configurable properties are accessible to a secure processing unit of the cryptographic system. In particular, the configurable properties may be stored along the associated cryptographic key in a secure memory of the cryptographic system, where they are accessible to the secure processing unit. However, the configurable properties cannot be modified by the secure processing unit (i.e., the properties are read-only). In this way, increasing the level of security is further facilitated. Furthermore, in one or more embodiments, the configurable properties are only readable by said secure processing unit. In other words, the configurable properties are set such that only the secure processing unit, and no other component of the system, can read them. In this way, increasing the level of security is further facilitated. In one or more embodiments, at least some of the configurable properties are mutually exclusive. Thereby, increasing the level of security is further facilitated.

In one or more embodiments, one or more operations performed on the cryptographic key or one or more operations performed using said cryptographic key are suspended or aborted if said operations are not permitted according to the configurable properties assigned to the cryptographic key. This may effectively prevent that the cryptographic keys are used without permission, such that the level of security is further increased. Furthermore, in one or more embodiments, the cryptographic key is flushed if one or more operations are performed on the cryptographic key or one or more operations are performed using the cryptographic key which are not permitted according to the configurable properties assigned to the cryptographic key. This facilitates implementing a stricter security policy, according to which a new cryptographic key should be generated after an attempt to use a current cryptographic key without permission.

In one or more embodiments, the cryptographic key is wrapped before said cryptographic key is transmitted to a non-secure component of the cryptographic processing system. In this way, the cryptographic key may remain uncompromised, despite its exposure to a non-secure part of the cryptographic processing system. Furthermore, in one or more embodiments, the cryptographic key is unwrapped when said cryptographic key is retrieved from the non-secure component of the cryptographic processing system. Accordingly, the cryptographic key may be used again by a secure component after having been exposed to a non-secure part of the cryptographic processing system. In one or more embodiments, the non-secure component is a non-volatile memory (i.e., a retention memory). Thus, the cryptographic key may be retained in a non-secure part of the cryptographic processing system while it remains protected.

In accordance with the present disclosure, configurable properties are assigned to cryptographic keys. The configurable properties may be regarded as attributes that define which operations can be performed on the cryptographic key and/or which operations can be performed by means of the cryptographic key. Furthermore, cryptographic keys are stored in a secure storage unit. These cryptographic keys may be used as root keys for deriving unique keys, which may be used by specific system applications. The unique keys may be used for performing various operations or cryptographic functions, such as encryption, decryption, wrapping and unwrapping. During a power-down state of a secure system, the uniquely derived keys may be stored in a non-secure external retention memory, such as a static random-access memory (SRAM). This kind of memory may be susceptible to leakage, counterfeiting and various types of attacks. In order to protect cryptographic keys which are stored in such a memory—for instance the aforementioned uniquely derived keys—they may be wrapped before they are transferred to it. In that case, when the secure system powers up, the unique keys may be retrieved from the external retention memory and extracted by means of an unwrapping operation. In addition, also root keys can be wrapped and stored in the external retention memory. In general, the presently disclosed method facilitates reducing the requirement for secure storage for a limited number of keys in the cryptographic processing system.

Furthermore, the configurable properties may ensure that cryptographic keys are not freely usable by a central processing unit (CPU). It is noted that such a CPU may also be a non-secure component of a cryptographic processing system. In a practical and secure implementation, secure cryptographic operations may be performed using a unique key derived from a root key. In that case, the configurable properties may be assigned to these unique keys. This may be done in a convenient manner during the derivation process which generates said unique keys. Accordingly, the configurable properties may form an integral part of the unique keys, which are created for a specific purpose. The configurable properties may define cryptographic capabilities associated with said keys (such as encryption, decryption and wrapping) and/or usage permissions associated with said keys (for example, that they can be exported, read and wrapped). The configurable properties may for example be used to halt a cryptographic operation if a cryptographic key is not used in accordance with the permissions defined by its properties. Furthermore, the cryptographic key may be flushed in such a case. Furthermore, when the unique keys are derived from a root key, they may be linked to a system state, for example a test state, production state, firmware version state, a counter state, in addition to the configurable properties. Key leakage during a system-power down state may be avoided by wrapping keys before they are retained in an external memory. Furthermore, the configurable properties may define whether a given cryptographic key can be used for deriving another cryptographic key. This may be useful to build a hierarchy of keys. The configurable properties may be assigned when a key is created, for example by means of derivation or by a transfer through an external interface, or when the key is unwrapped. Some of the properties may be mutually exclusive, e.g. a derivation key or a wrapping key may not have any permission other than the permission to use them for derivation and wrapping, respectively.

Figure 3:
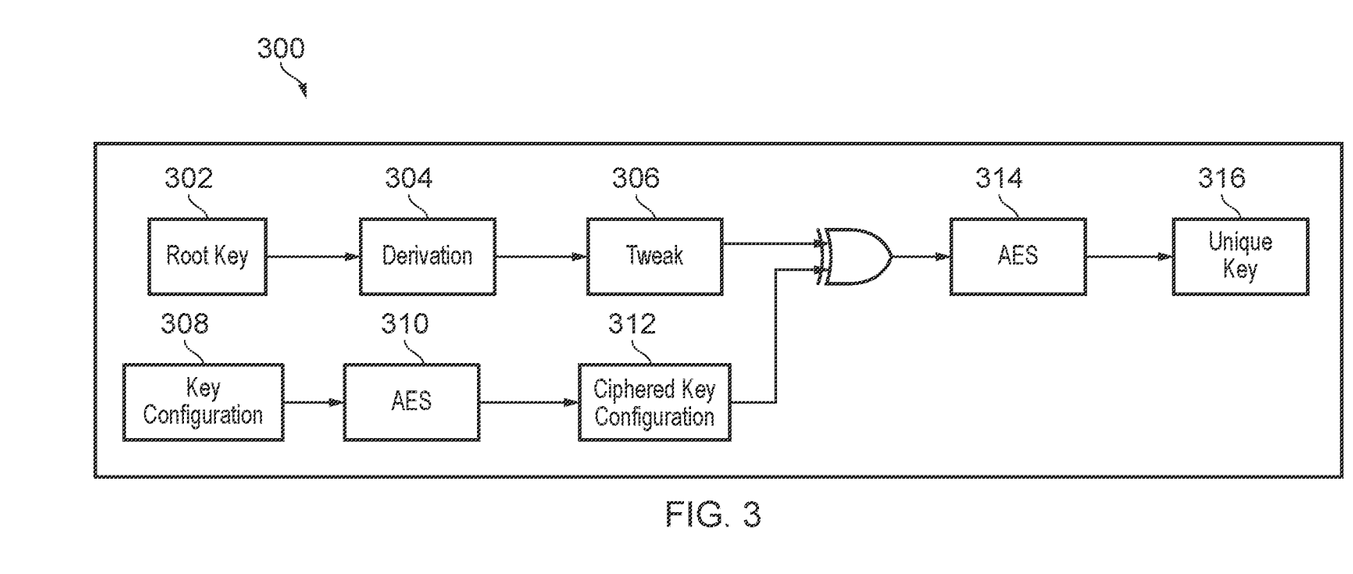
FIG. 3 shows an illustrative embodiment of a key derivation operation.

FIG. 3 shows an illustrative embodiment of a key derivation operation 300. The key derivation operation 300 includes a derivation step 304 that takes a root key 302 as an input. The derivation step 304 may for example include a shift function and a conditional XOR function to generate a derived key. The output of the derivation step 304, i.e. the derived key, may undergo a tweak step 306. The tweak step 306, which increases the level of security, may include an XOR operation on the generated subkey and a 128-bit CPU programmed value. Furthermore, key configuration data 308 may be encrypted using an advanced encryption standard (AES) operation 310, resulting in ciphered key configuration data 312. It is noted that the key configuration data represent configurable properties of the kind set forth. In addition to the configurable properties of the key to be derived, the key configuration data may include a test state, production state, a firmware version state and/or a counter state. After the derivation has been carried out, the configurable properties included in the key configuration data 308 may be assigned to a key configuration register corresponding to the derived key. The output of the tweak step 306 is combined with the ciphered key configuration data 312 in an XOR operation. The output of the XOR operation is again encrypted using an AES operation, which results in a unique key 316. In other words, the configurable properties of a cryptographic key and a predefined state of the system may be XORed with derivation data. The tweaking may form part of a commonly known key derivation function, such as CMAC. It is noted that key derivation functions other than CMAC may also be applied. The whole operation may thus amount to a derivation of a unique cryptographic key using derivation data set by a CPU, wherein said derivation data are tweaked in hardware to reflect the configuration of the key and the state of the system. Furthermore, the key configuration register may be enabled only for certain operations, for example an encryption operation using the unique cryptographic key. In that case, other operations than encryption using the unique cryptographic key will not succeed. When the system is in use, a secure CPU may be able to access the key configuration data 308 associated with the derived unique key 316, such that the secure CPU may be able to carry out an operation. Any illegal operation may result in an abort.

More specifically, the process of deriving a unique key from a root key may involve two steps, i.e. a derived key generation and a ciphered key configuration. The derived key generation may be based on a lock cipher-based MAC algorithm (CMAC), as described in NIST Special Publication 800-38B "Recommendation for Block Cipher Modes of Operation: The CMAC Mode for Authentication", available from doi.org. Part of the derivation data may be provided by a user whereas another part of the derivation data may be linked to the state of the cryptographic processing system (for example a test state, production state, firmware version state, a counter state as controlled by a one-time programmable register or hardware event). The key properties used for deriving the unique key may also be provided by a user. These may be encrypted using the root key in order to provide ciphered key configuration data.

Figure 4:
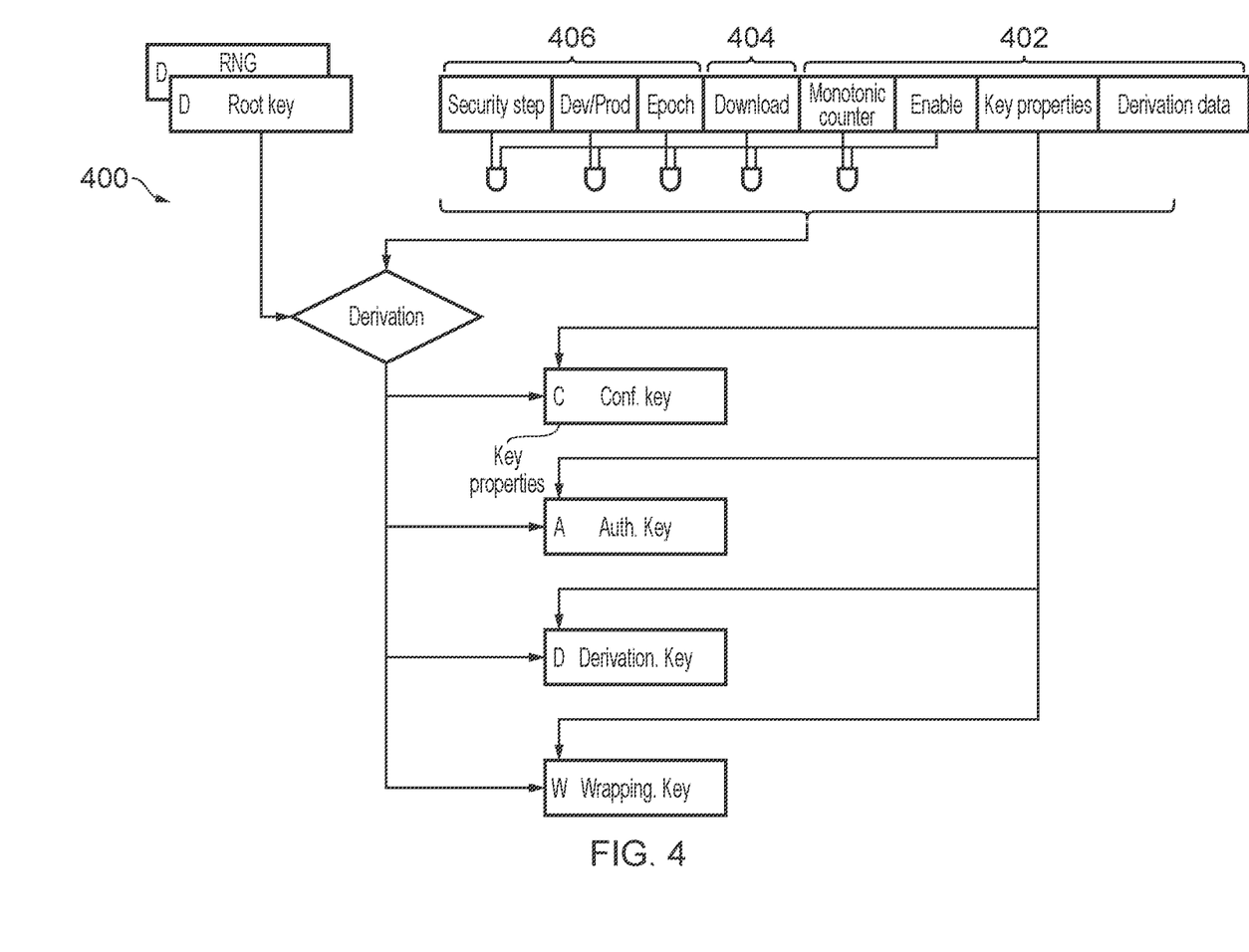
FIG. 4 shows an illustrative embodiment of a derived key generation.

FIG. 4 shows an illustrative embodiment of a derived key generation 400. A derived key generated using CMAC may be XORed with ciphered key configuration and encrypted using a root key in order to derive a unique key. This derived unique key may be used for specific system applications such as encryption and decryption of plaintext and ciphertext, respectively, wrapping and unwrapping of unique ciphered keys and to derive other unique keys based on the specified key configuration. The key properties may be kept in a register 402 set by firmware, while for example a predefined state to be linked to a key may be kept in a one-time programmable register 406. Alternatively or in addition, a register set at firmware download 404 may be used. The key properties may be used to derive a configured key (i.e., a derived key of the kind set forth).

Figure 5:
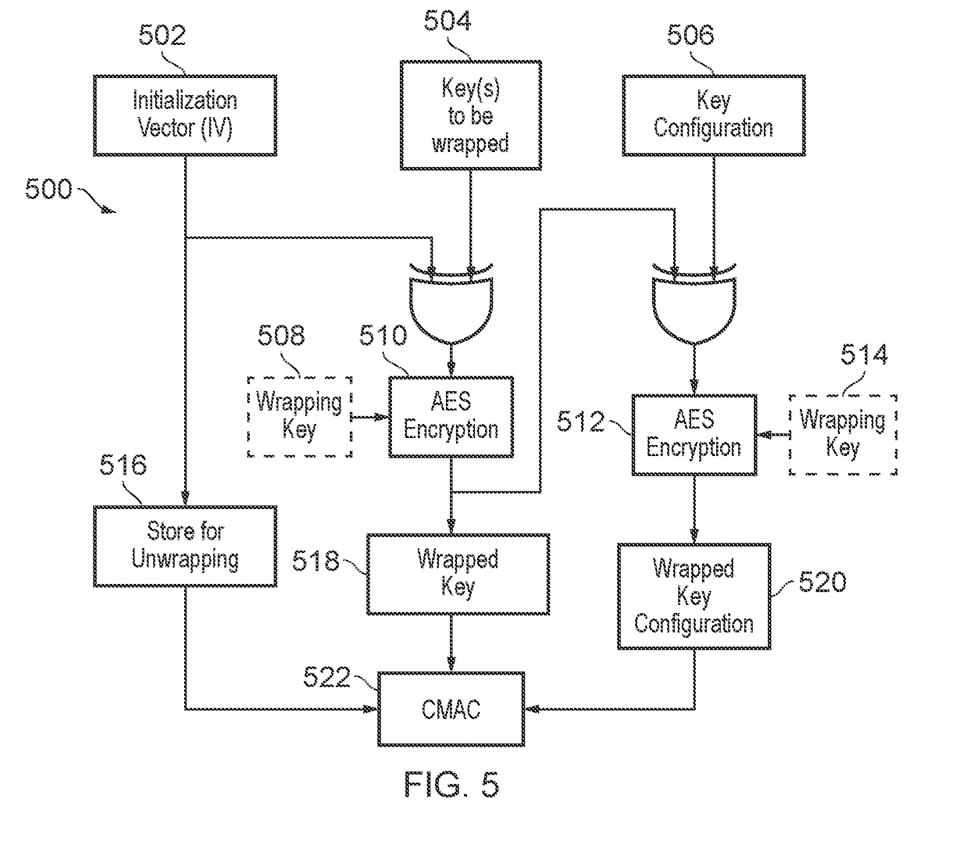
FIG. 5 shows an illustrative embodiment of a key wrapping operation.
Figure 6:
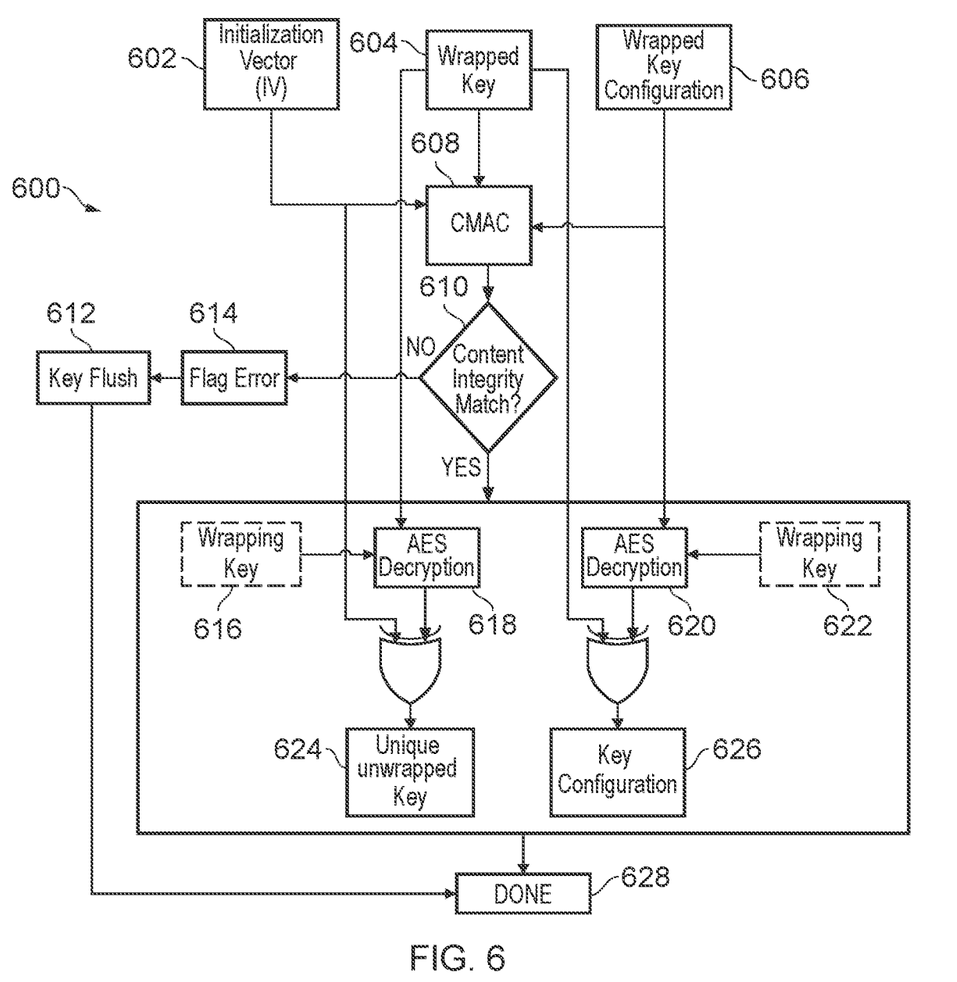
FIG. 6 shows an illustrative embodiment of a key unwrapping operation.

FIG. 5 shows an illustrative embodiment of a key wrapping operation 500. In particular, a process is shown for wrapping of cryptographic keys using wrapping keys 508, 514. As mentioned above, a cryptographic key may be wrapped before it is transferred to an external retention memory when the cryptographic processing system enters a power-down mode or power-down state. This may protect the integrity and confidentiality of the cryptographic key and its configuration. The key or keys 504 that should be wrapped are wrapped by means of an AES encryption operation 510 that uses an initialization vector 502 XOR-ed with said key or keys 504, as well as a wrapping key 508, as input. Said AES encryption operation 510 outputs a wrapped key 518. The initialization vector 502 is also stored 516 for use in a subsequent unwrapping operation, as shown in FIG. 6. The output of the AES encryption operation 510 is also fed to an XOR unit, together with key configuration data 506. The output of the XOR operation serves as input to another AES encryption operation 512, by means of which the configurable properties (i.e., the key configuration data) assigned to the key or keys 504 to be wrapped are encrypted. The AES encryption operation 512 also uses a wrapping key 514 as input, and outputs a wrapped key configuration 520. Finally, a CMAC operation 522 is performed on the stored initialization vector 516, wrapped key 518 and wrapped key configuration 520. The initialization vector (IV) may be generated by a pseudo-random number generator (PRNG). The keys and its properties may be encrypted using a cipher block chaining (CBC) method. The CMAC is generated on the IV, encrypted key and encrypted key properties. Accordingly, the generated CMAC may be used as a reference for performing the corresponding unwrapping operation. The IV, wrapped key, wrapped key configuration and CMAC may be stored in the external retention memory (e.g. an SRAM) before the system enters a power-down mode.

FIG. 6 shows an illustrative embodiment of a key unwrapping operation 600. The key unwrapping operation 600 includes a CMAC operation 608 which takes the initialization vector 602, wrapped key 604 and wrapped key configuration 606 as inputs. The CMAC operation 608 serves the purpose of verifying the integrity of the content of the received message, which includes the wrapped key and its configuration. If the content integrity verification step 610 fails, then an error is flagged 614 and the cryptographic key is flushed 612. The key unwrapping operation 600 then ends in step 628. If the content integrity verification step 610 succeeds, then both the wrapped key 604 and its wrapped configuration data 606 are unwrapped using AES decryption operations 618, 620, which use the aforementioned wrapping keys 616, 622 as respective inputs. The AES decryptions 618, 620 result in a unique unwrapped key 624 and unwrapped key configuration data 626, respectively. The unique unwrapped key 624 can then be used by the secure component (e.g. a CPU) which has retrieved the wrapped key and its wrapped configuration, to perform operations. In other words, key unwrapping may involve the following steps. The wrapped key, IV and wrapped key configuration data are retrieved from an external, non-secure memory. Then the CMAC is calculated on the imported wrapped information (i.e., the retrieved information). If the calculated CMAC matches with a reference CMAC, then the wrapped key and the wrapped configuration data are unwrapped using CBC decryption. If the calculated CMAC does not match with the reference CMAC, then all imported data are flushed, and an error message will be generated indicating that the key is compromised. It is noted that an individual or multiple key bank can be cleared using a key flush operation. A key flush operation may write pseudo random data into individual or all selected key banks. The key flush operation to the selected key banks may reset the corresponding key configuration properties as well.

Figure 7:
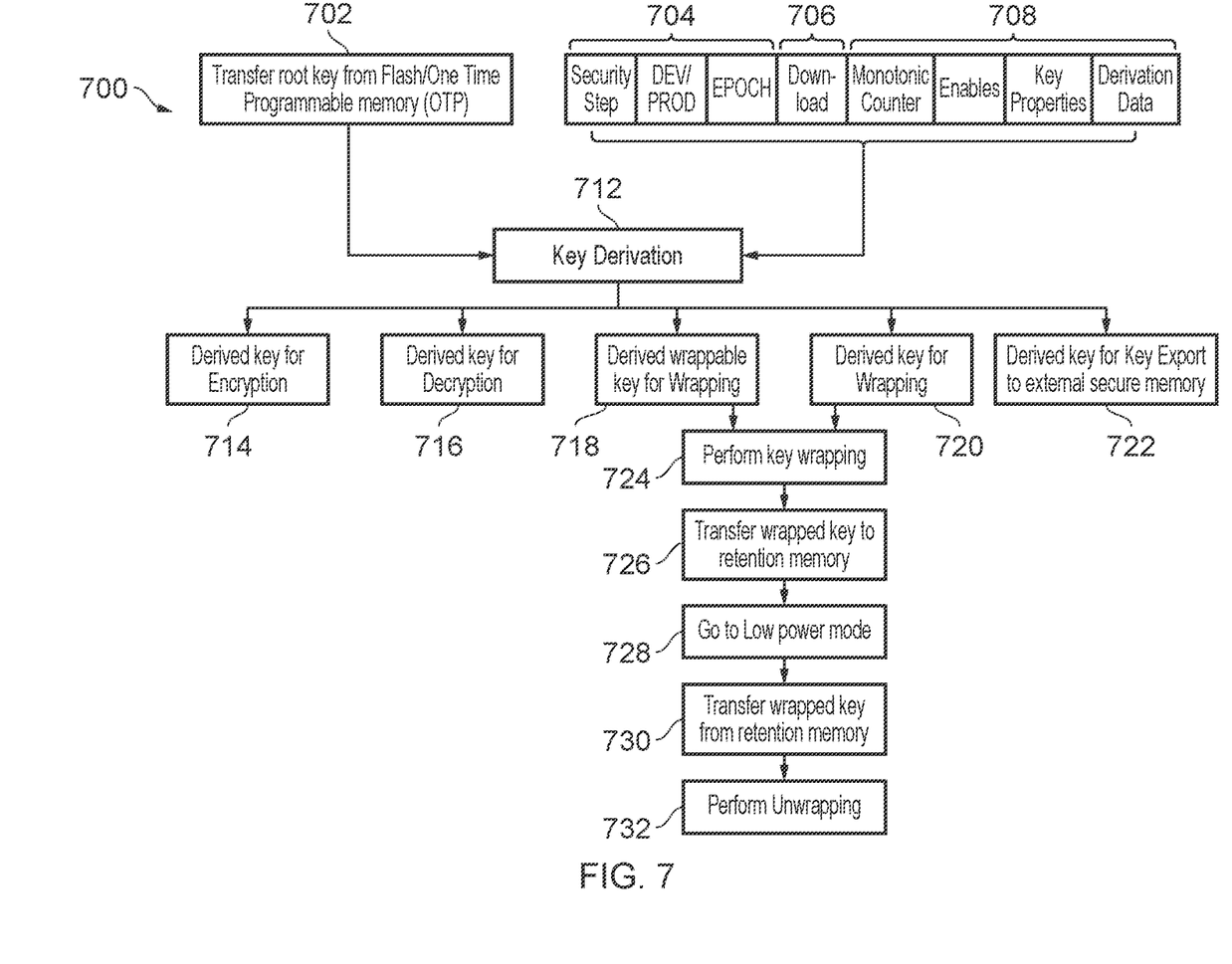
FIG. 7 shows an illustrative embodiment of a key processing.

FIG. 7 shows an illustrative embodiment of a key processing 700. In particular, FIG. 7 shows how several keys are derived using a root key 702 transferred from a Flash memory or a one-time programmable (OTP) memory. A key derivation function 712 may take as an input the root key, the derivation data set by the CPU with a part of the derivation data replaced by the aforementioned tweaking, wherein the tweaking is based on the configurable key properties and the predefined system state. Note that the use of the predefined system state in the tweaking is optional, so that the tweaking may also include tweaking the derivation data in such a way that the result of the tweaking reflects whether or not it was based on the predefined system state, in addition to the configurable key properties. Some derived keys 714, 716 are encryption and decryption keys, respectively, which means that they can be used as input to the encryption and decryption operation, respectively. Another derived cryptographic key 718 may be used for various purposes; this cryptographic key 718 can be wrapped 724 and exported (i.e., transferred 726) to a retention memory. For this purpose, a wrapping key 720 has been derived as well. After the cryptographic processing system has been in a low-power mode 728 and has returned to a normal-power mode, the wrapped key can be imported back 730 to the processing unit. Said processing unit 732 then performs an unwrapped operation 732 as explained in detail with reference to FIG. 6. It is noted that in addition to the protection provided by wrapping the exported cryptographic key, the messages exchanged between the processing unit and the retention memory—which include the wrapped key—may be protected by encrypting them. Another derived key 722 may an exportable key, which means that it can be exported to for example a Flash memory or a one-time programmable (OTP) memory. This key 722 may be used as a root key for other cryptographic operations. It is noted that the exportable key 722 may be masked with a specific input value received from an external unit.

The systems and methods described herein may at least partially be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, a state machine, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random-access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 method for protecting cryptographic keys
102 generating at least one cryptographic key to be protected
104 assigning one or more configurable properties to said cryptographic key, wherein the configurable properties define at least one of a permission of performing a first set of predefined operations on the cryptographic key and a permission of using the cryptographic key for performing a second set of predefined operations
200 cryptographic processing system
202 key generation unit
204 processing unit
300 key derivation operation
302 root key
304 derivation
306 tweak
308 key configuration
310 AES
312 ciphered key configuration
314 AES
316 unique key
400 derived key generation
402 registers set by firmware
404 register set at firmware download
406 one-time programmable registers
500 key wrapping operation
502 initialization vector
504 key(s) to be wrapped
506 key configuration
508 wrapping key
510 AES encryption
512 AES encryption
514 wrapping key
516 store for unwrapping
518 wrapped key
520 wrapped key configuration
522 CMAC
600 key unwrapping operation
602 initialization vector
604 wrapped key
606 wrapped key configuration
608 CMAC
610 content integrity match?
612 key flush
614 flag error
616 wrapping key
618 AES decryption
620 AES decryption
622 wrapping key
624 unique unwrapped key
626 key configuration
628 done
700 key processing
702 transfer root key from Flash/OTP memory
704 one-time programmable registers
706 register set at firmware download
708 registers set by firmware
712 key derivation
714 derived key for encryption
716 derived key for decryption
718 derived wrappable key for wrapping
720 derived key for wrapping
722 derived key for key export to external secure memory
724 perform key wrapping
726 transfer wrapped key to retention memory
728 go to low-power mode
730 transfer wrapped key from retention memory
732 perform unwrapping

The invention claimed is:

1. A method for setting permissions for cryptographic keys in a cryptographic processing system, comprising:
generating at least one cryptographic key to be protected;
assigning one or more configurable properties to said cryptographic key;
wherein the configurable properties define at least one of a permission of performing a first set of predefined operations on the cryptographic key and a permission of using the cryptographic key for performing a second set of predefined operations,
wherein the configurable properties are assigned to the cryptographic key when said cryptographic key is derived from a root key, and
wherein said configurable properties are encrypted and then used to adjust derivation data used for deriving the cryptographic key from the root key.

2. The method of claim 1, wherein the first set of predefined operations includes at least one of the following operations:
reading the cryptographic key by a processing unit;
exporting the cryptographic key to an external device;
wrapping the cryptographic key;
unwrapping the cryptographic key.

3. The method of claim 1, wherein the second set of predefined operations includes at least one of the following operations:
using the cryptographic key to generate another cryptographic key;
using the cryptographic key to wrap another cryptographic key;
using the cryptographic key to perform a predefined cryptographic function, wherein the cryptographic function includes encrypting and/or decrypting data with said cryptographic key.

4. The method of claim 1, wherein the cryptographic key is associated with at least one predefined state of the cryptographic processing system when said cryptographic key is derived from the root key.

5. The method of claim 4, wherein one or more operations performed using said cryptographic key fail when a current state of the cryptographic processing system does not correspond to said predefined state.

6. The method of claim 1, wherein the configurable properties are accessible to a secure processing unit of the cryptographic system.

7. The method of claim 6, wherein the configurable properties are only readable by said secure processing unit.

8. The method of claim 1, wherein at least some of the configurable properties are mutually exclusive.

9. The method of claim 1, wherein one or more operations performed on the cryptographic key or one or more operations performed using said cryptographic key are suspended or aborted when said operations are not permitted according to the configurable properties assigned to the cryptographic key.

10. The method of claim 1, wherein the cryptographic key is flushed when one or more operations are performed on the cryptographic key or one or more operations are performed using the cryptographic key which are not permitted according to the configurable properties assigned to the cryptographic key.

11. The method of claim 1, wherein the cryptographic key is wrapped before said cryptographic key is transmitted to a non-secure component, in particular to a non-volatile memory, of the cryptographic processing system.

12. The method of claim 11, wherein the cryptographic key is unwrapped when said cryptographic key is retrieved from the non-secure component of the cryptographic processing system.

13. The method of claim 1, wherein the method is implemented in a computer program comprising executable instructions, which, when executed by the cryptographic processing system, carry out the method.

14. A cryptographic processing system, comprising:
   a key generation unit configured to generate at least one cryptographic key;
   the key generation unit further being configured to assign one or more configurable properties to said cryptographic key;
   wherein the configurable properties define at least one of a permission of performing a first set of predefined operations on the cryptographic key and a permission of using the cryptographic key for performing a second set of predefined operations,
   wherein the configurable properties are assigned to the cryptographic key when said cryptographic key is derived from a root key, and
   wherein said configurable properties are encrypted and then used to adjust derivation data used for deriving the cryptographic key from the root key.

15. The cryptographic processing system of claim 14, wherein the first set of predefined operations includes at least one of the following operations:
   reading the cryptographic key by a processing unit;
   exporting the cryptographic key to an external device;
   wrapping the cryptographic key;
   unwrapping the cryptographic key.

16. The cryptographic processing system of claim 14, wherein the second set of predefined operations includes at least one of the following operations:
   using the cryptographic key to generate another cryptographic key;
   using the cryptographic key to wrap another cryptographic key;
   using the cryptographic key to perform a predefined cryptographic function, wherein the cryptographic function includes encrypting and/or decrypting data with said cryptographic key.

17. The cryptographic processing system of claim 14, wherein the cryptographic key is associated with at least one predefined state of the cryptographic processing system when said cryptographic key is derived from the root key.

18. The cryptographic processing system of claim 17, wherein one or more operations performed using said cryptographic key fail if a current state of the cryptographic processing system does not correspond to said predefined state.

* * * * *